US010981056B2

(12) United States Patent
Hunt et al.

(10) Patent No.: US 10,981,056 B2
(45) Date of Patent: *Apr. 20, 2021

(54) METHODS AND SYSTEMS FOR DETERMINING A REACTION TIME FOR A RESPONSE AND SYNCHRONIZING USER INTERFACE(S) WITH CONTENT BEING RENDERED

(71) Applicant: Apple Inc., Cupertino, CA (US)

(72) Inventors: Daniel Carter Hunt, Carlsbad, CA (US); Cori Anne Shearer, San Francisco, CA (US); Bronwyn Elizabeth Mahieu, Escondido, CA (US); Jeffrey Clemens Ludden, San Diego, CA (US); Mily Gupta Dahlke, San Diego, CA (US); Brian Jeffrey Kaull, Escondido, CA (US); Avery Li-Chun Wang, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/232,838

(22) Filed: Dec. 26, 2018

(65) Prior Publication Data

US 2019/0143212 A1 May 16, 2019

Related U.S. Application Data

(63) Continuation of application No. 15/587,273, filed on May 4, 2017, now Pat. No. 10,166,472.

(51) Int. Cl.
*A63F 13/44* (2014.01)
*A63F 9/00* (2006.01)
(Continued)

(52) U.S. Cl.
CPC .......... *A63F 13/44* (2014.09); *A63F 9/0096* (2013.01); *A63F 13/215* (2014.09);
(Continued)

(58) Field of Classification Search
None
See application file for complete search history.

(56) References Cited

U.S. PATENT DOCUMENTS 5,695,400 A * 12/1997 Fennell, Jr. ............. A63F 13/12
463/42
7,715,780 B1    5/2010 Beamish
(Continued)

FOREIGN PATENT DOCUMENTS

EP          0474923 A1    3/1992

OTHER PUBLICATIONS

International Search Report and Written Opinion prepared by the European Patent Office in International Application No. PCT/IB2018/000550, dated Jul. 25, 2018.

*Primary Examiner* — Damon J Pierce
(74) *Attorney, Agent, or Firm* — Blank Rome LLP

(57) ABSTRACT

Example methods and systems for computing a reaction time from an indexed event occurring in an indexed recording to a reaction signal are described. An example method includes receiving a sample of ambient content of a computing device, determining a position identification of the sample of ambient content into an indexed recording to which the sample of ambient content matches, based on the position identification, synchronizing display of content on a user interface of the computing device to the indexed recording, and computing the reaction time. The reaction signal is generated by the computing device and is indicative of a user's response to the indexed event.

20 Claims, 13 Drawing Sheets

(51) Int. Cl.
  *H04N 21/43*    (2011.01)
  *H04N 21/475*   (2011.01)
  *G06F 16/61*    (2019.01)
  *A63F 13/80*    (2014.01)
  *A63F 13/54*    (2014.01)
  *A63F 13/215*   (2014.01)
  *A63F 13/327*   (2014.01)
  *A63F 13/332*   (2014.01)
  *A63F 13/46*    (2014.01)
  *A63F 13/493*   (2014.01)
  *A63F 13/65*    (2014.01)
  *G06F 3/16*     (2006.01)
  *G09G 5/12*     (2006.01)
  *H04N 21/41*    (2011.01)
  *H04N 21/478*   (2011.01)

(52) U.S. Cl.
  CPC .......... *A63F 13/327* (2014.09); *A63F 13/332* (2014.09); *A63F 13/46* (2014.09); *A63F 13/493* (2014.09); *A63F 13/54* (2014.09); *A63F 13/65* (2014.09); *A63F 13/80* (2014.09); *G06F 3/165* (2013.01); *G06F 16/61* (2019.01); *G09G 5/12* (2013.01); *H04N 21/4126* (2013.01); *H04N 21/4307* (2013.01); *H04N 21/4758* (2013.01); *H04N 21/4781* (2013.01); *A63F 2300/8064* (2013.01); *G09G 2354/00* (2013.01)

(56) References Cited

U.S. PATENT DOCUMENTS

| | | |
|---|---|---|
| 8,840,474 B1 | 9/2014 | Dasan |
| 8,858,313 B1 | 10/2014 | Selfors |
| 2005/0255901 A1 | 11/2005 | Kreutzer |
| 2012/0178527 A1 | 7/2012 | Kaskie |
| 2013/0005465 A1 | 1/2013 | Murphy |
| 2013/0262365 A1 | 10/2013 | Dolbear |
| 2014/0280233 A1 | 9/2014 | Wang |

\* cited by examiner

DETERMINING AN AMOUNT OF TIME BETWEEN THE INDEXED EVENT OCCURRING AND RECEIPT OF THE SELECTION OF CONTENT

FIG. 18 — 244

RECEIVING, AT THE USER INTERFACE OF THE COMPUTING DEVICE, A RESPONSIVE COMMUNICATION TO THE SELECTION OF CONTENT INDICATING WHETHER THE SELECTION OF CONTENT MATCHED AN ANSWER TO THE INDEXED EVENT

FIG. 19 — 246

RECEIVING, AT THE USER INTERFACE OF THE COMPUTING DEVICE, A RESPONSIVE COMMUNICATION TO THE SELECTION OF CONTENT INDICATING A CORRECT SELECTION OF CONTENT THAT MATCHED AN ANSWER TO THE INDEXED EVENT

FIG. 20 — 248

BASED ON NOT RECEIVING THE SELECTION OF CONTENT FROM THE INFORMATION ASSOCIATED WITH THE INDEXED EVENT WITHIN A DEFAULT TIMESPAN, RECEIVING, AT THE USER INTERFACE OF THE COMPUTING DEVICE, A RESPONSIVE COMMUNICATION INDICATING A CORRECT SELECTION OF CONTENT THAT MATCHED AN ANSWER TO THE INDEXED EVENT

FIG. 21 — 250

PROVIDING POSSIBLE ANSWERS TO THE GAMEPLAY OF THE GAME SHOW

FIG. 22 — 252

BASED ON NOT RECEIVING THE SELECTION OF CONTENT FROM THE INFORMATION ASSOCIATED WITH THE INDEXED EVENT PRIOR TO A CONTESTANT ON THE GAME SHOW PROVIDING AN ANSWER TO THE GAMEPLAY, PROVIDING, TO THE USER INTERFACE OF THE COMPUTING DEVICE, A RESPONSIVE COMMUNICATION INDICATING A CORRECT SELECTION OF CONTENT THAT MATCHED AN ANSWER TO THE INDEXED EVENT

FIG. 23 — 254

METHODS AND SYSTEMS FOR DETERMINING A REACTION TIME FOR A RESPONSE AND SYNCHRONIZING USER INTERFACE(S) WITH CONTENT BEING RENDERED

FIELD

The present disclosure relates to synchronizing user interfaces on a computing device with content being rendered and determining a reaction time for a selection of content associated with the content being rendered. Within some examples, audio from a television game show can be recorded by a computing device and used to synchronize timing of functionality of a user interface on the computing device to enable a user to compete with contestants on the game show.

BACKGROUND

A game show is a type of radio, television, or internee program in which contestants play a game, and usually a winner s determined and awarded a prize. Contestants may be invited from a pool of public applicants, and the contestants may compete against other players or another team, or perhaps may simply play alone for a reward or a high score.

A viewer or listener of the game show often can along and attempt to answer questions and compete with the contestants, although the competition is merely conceptually in the viewers mind. Some second screen technology exists that involves use of a computing device to provide an enhanced viewing experience for content on television, such as interactive features during broadcast content including social media postings on social networking platforms. But, the use of second screen technology still does not allow a viewer to compete with contestants on the game show in a realistic manner.

SUMMARY

In one example, a method is described that includes receiving a sample of ambient content of a computing device, determining a position identification of the sample of ambient content into an indexed recording to which the sample of ambient content matches, based on the position identification, synchronizing display of content on a user interface of the computing device to the indexed recording, and computing a reaction time from an indexed event occurring in the indexed recording to a reaction signal. The reaction signal is generated by the computing device and indicative of a user's response to the indexed event.

In another example, a non-transitory computer readable medium is described having stored thereon instructions, that when executed by one or more processors, cause the one or more processors to perform functions. The functions include receiving a sample of ambient content of a computing device, determining a position identification of the sample of ambient content into an indexed recording to which the sample of ambient content matches, based on the position identification, synchronizing display of content on a user interface of the computing device to the indexed recording, and computing a reaction time from an indexed event occurring in the indexed recording to a reaction signal. The reaction signal is generated by the computing device and indicative of a user's response to the indexed event.

In still another example, a computing device is described that includes one or more processors, and non-transitory computer readable medium storing instructions, that when executed by the one or more processors, causes the one or more processors to perform functions. The functions include receiving a sample of ambient content of the computing device, determining a position identification of the sample of ambient content into an indexed recording to which the sample of ambient content matches, based on the position identification, synchronizing display of content on a user interface of the computing device to the indexed recording, and computing a reaction time from an indexed event occurring in the indexed recording to a reaction signal. The reaction signal is generated by the computing device and indicative of a user's response to the indexed event.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 18 shows a flowchart of an example method that may be used with the method of FIG. 8, according to an example implementation.

FIG. 19 shows a flowchart of an example method that may be used with the method of FIG. 8, according to an example implementation.

FIG. 20 shows a flowchart of an example method that may be used with the method of FIG. 8, according to an example implementation.

FIG. 21 shows a flowchart of an example method that may be used with the method of FIG. 8, according to an example implementation.

FIG. 22 shows a flowchart of an example method that may be used with the method of FIG. 8, according to an example implementation.

FIG. 23 shows a flowchart of an example method that may be used with the method of FIG. 8, according to an example implementation.

DETAILED DESCRIPTION

Figure 1:
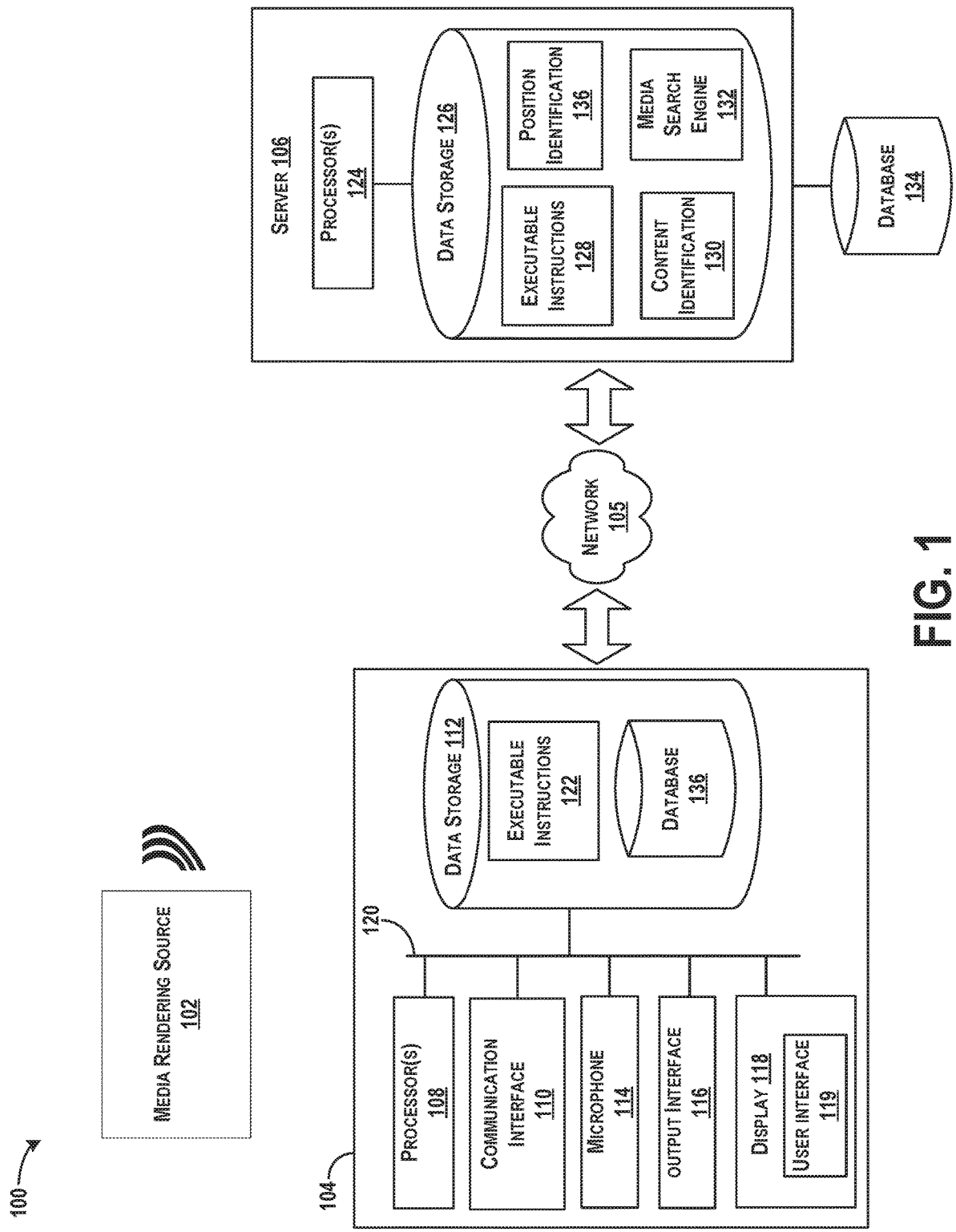
FIG. 1 illustrates one example of a system 100, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples described herein, systems, devices, and methods are described for computation of a reaction time from an indexed event occurring in an indexed recording to a reaction signal, after synchronization of display of content on a user interface of a computing device to the indexed recording. Initially, a sample of ambient content of the computing device is received, and a position identification of the sample of ambient content into the indexed recording to which the sample of ambient content matches is determined. The position identification is used to synchronize display of content on the user interface of the computing device to the indexed recording. Following, the reaction time from the indexed event occurring in the indexed recording to the reaction signal is computed, and the reaction signal is generated by the computing device and is indicative of a user's response to the indexed event.

An example implementation includes the user interface of the computing device initiating a gameplay interface for association of the computing device with the indexed recording, and synchronizing of the computing device to the indexed recording enables display content on the gameplay interface to follow the indexed recording. The indexed recording may be an indexed television game show, for example, and a user at home can watch the television game show and utilize a computing device to play along. After synchronization of the gameplay interface to the television game show, the computing device may provide questions to the user, or information associated with the indexed event for a selection of content as a possible answer. After receiving a selection by the user at the user interface of the computing device, a responsive communication is provided indicating whether the selection of content matched an answer to the indexed event, or whether the selection of content was a correct answer, for example.

The reaction time of the user's response is also computed, and can be used for many purposes to further gameplay and functionality of the user interface. In one example, the reaction time of the user can be compared with a reaction time taken by contestants on the game show to provide an answer to the gameplay. An output of the comparison can be to determine which of the contestants or the user of the computing device has a lowest reaction time so that the user can virtually or conceptually compete with the contestants. Thus, the reaction time indicates a conceptual amount of time a user would have taken, had they been on the game show, and can be compared against the contestants. The example methods, systems, and devices described provide an abridged second screen experience to users.

Referring now to the figures, FIG. 1 illustrates one example of a system 100, according to an example implementation. While FIG. 1 illustrates a system that has a given configuration, components within the system may be arranged in other manners. The system includes a media rendering source 102 that renders and presents content from a media stream in any known manner, a computing device 104, and a server 106. The computing device 104 may communicate with the server 106 over a network 105.

The media rendering source 102 may store the media stream on the media rendering source 102, or receive the media stream from external sources, such as an analog or digital broadcast. In one example, the media rendering source 102 may be a radio station or a television content provider that broadcasts media streams (e.g., audio and/or video) and/or other information. Thus, media content of the media stream may include a number of songs, television programs, or any type of audio and/or video recordings, or any combination of such. The media rendering source 102 may also be any type of device that plays audio and/or video media in a recorded or live format, such as a television, a radio, a computer, etc. In an alternate example, the media rendering source 102 may include a live performance as a source of audio and/or a source of video, for example. The media rendering source 102 may render or present the media stream through a graphical display, audio speakers, a MIDI musical instrument, an animatronic puppet, etc., or any combination of such presentations provided by the media rendering source 102, for example.

The computing device 104 includes a processor(s) 108, a communication interface 110, data storage 112, a microphone 114, an output interface 116, and a display 118 each connected to a communication bus 120. The computing device 104 may also include hardware to enable communication within the computing device 104 and between the computing device 104 and other devices, such as the media rendering source 102 and the server 106. The hardware may include transmitters, receivers, and antennas, for example.

The computing device 104 can be implemented as a portion of a small-form factor portable (or mobile) electronic device such as a cell phone, a wireless cell phone, a personal data assistant (PDA), tablet computer, a laptop computer, a personal media player device, a wireless webwatch device, a personal headset device, an application specific device, or a hybrid device that include any of the above functions. The computing device 104 can also be implemented as a personal computer including both laptop computer and non-laptop computer configurations. The computing device 104 can also be a component of a larger device or system as well.

The processor(s) 108 may be a general-purpose processor or a special purpose processor (e.g., digital signal processors, application specific integrated circuits, etc.). The processor(s) 108 may receive inputs from the communication interface 110 or the microphone 114, and process the inputs according to the executable instructions 122 stored in the data storage 112 to generate outputs that can also be stored in the data storage 112 and/or output to the display 118. The processor(s) 108 can be configured to execute the executable instructions 122 (e.g., computer-readable program instructions) that are stored in the data storage 112 and are executable to provide functionality of the computing device 104 and/or the system 100 described herein. Although one processor is shown in the computing device 104, multiple processors may be included in the computing device 104.

The communication interface 110 may be a wireless interface and/or one or more wireline interfaces that allow for both short-range communication and long-range communication to one or more networks or to one or more remote devices. Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 110 may be configured to receive input data from one or more sources, and may also be configured to send output data to other sources. As an example, the communication interface 110 may receive samples of content from the media rendering source 102 a wireless communication or a wired communication.

The computing device 104 may receive a sample of content rendered by the media rendering source 102 or a rendering of the media stream from the media rendering source 102 through the communication interface 110. In one example, the communication interface 110 may include antenna, in which case the media rendering source 102 may broadcast the media stream wirelessly to the computing device 104. However, depending on a form of the media stream, the media rendering source 102 may render the media using wireless or wired communication techniques. In other examples, the communication interface 110 can include any of a microphone, video camera, vibration sensor, radio receiver, network interface, etc. The communication interface 110 may be preprogrammed to capture media samples continuously without user intervention, such as to record all audio received and store recordings in a buffer of the data storage 112. The buffer may store a number of recordings or samples, or may store recordings for a limited time, such that the computing device 104 may record and store recordings in predetermined intervals, for example, or in a way so that a history of a certain length backwards in time is available for analysis. In other examples, capturing of the media sample may be caused or triggered by a user activating a button or other application to trigger the sample capture.

The microphone 114 can record samples of audio for the computing device 104. For example, the microphone 114 may record a sample of ambient audio of the computing device 104 and send the sample to the processor(s) 108.

The output interface 116 may be similar to the communication interface 110, and can include an antenna to transmit information to other devices. The output interface 116 can also include any number of ports for connection of wired transmission interfaces.

The display 118 may be a digital display and/or a touchscreen display. The display 118 can receive outputs of the processor(s) 108 for displaying a graphical user interface (GUI) or user interface 119 on the display 118. The processor(s) 108 may execute the executable instructions 122 to create a data layout, and additional functionality of the user interface 119 on the display 118. The user interface 119 may be of a standard type of user interface allowing a user to interact with the computing device 104 that employs graphical images in addition to text to represent information and actions available to the user. Actions may be performed through direct manipulation of graphical elements, which include windows, buttons, menus, and scroll bars, for example.

The data storage 112 may include or take the form of one or more computer-readable storage media that can be read or accessed by the processor(s) 108. The computer-readable storage media can include volatile and/or non-volatile storage components, such as optical, magnetic, organic or other memory or disc storage, which can be integrated in whole or in part with the processor(s) 108. The data storage 112 is considered non-transitory computer readable media. In some examples, the data storage 112 can be implemented using a single physical device (e.g., one optical, magnetic, organic or other memory or disc storage unit), while in other examples, the data storage 112 can be implemented using two or more physical devices.

The data storage 112 thus is a non-transitory computer readable storage medium, and executable instructions 122 are stored thereon. The instructions 122 include computer executable code. When the instructions 122 are executed by the processor(s) 108, the processor(s) 108 are caused to perform functions. Such functions include receiving a sample of ambient content of the computing device 104, synchronizing display of content to indexed recordings, and computing a reaction time from an indexed event occurring in the indexed recording to a reaction signal, as described more fully below.

The output interface 116 outputs information to the display 118 or to other components as well. Thus, the output interface 116 may be similar to the communication interface 110 and can be a wireless interface (e.g., transmitter) or a wired interface as well.

The system 100 in FIG. 1 further includes the network 105 (e.g., Internet, cellular network, Wifi network, etc.) to which the computing device 104 may be coupled via a wireless or wired link. The server 106 is also coupled to the network 105, and the server 106 includes one or more processor(s) 124 coupled to data storage 126. The processor (s) 124 and the data storage 126 of the server 106 may be similar to the processor(s) 108 and the data storage 112 of the computing device 104.

The server 106 may be configured to index media content rendered by the media rendering source 102, and to perform position and/or content identifications of samples of content to the indexed content recordings. For example, the data storage 126 includes executable instructions 128 for performing a content identification 130 of a sample of content. The content identification 130 functions can include referencing a media search engine 132 to search a database 134 of indexed recordings, for example, to compare the sample of content with the stored information so as to an indexed recording to which the sample of ambient content matches. The database 134 may store indexed recordings that include information to identify samples of content. The indexed recordings may include media recordings such as music, advertisements, jingles, movies, documentaries, television and radio programs. Each recording may be identified by a unique identifier (e.g., sound_ID or program_ID). Alternatively, the database 134 may not necessarily store audio or video files for each indexed recording, since the IDs can be used to retrieve files from elsewhere. The database 134 may yet additionally or alternatively store representations for multiple indexed recordings as a single data file where all indexed recordings are concatenated end to end to conceptually form a single media content recording, for example. The database 134 may include other information (in addition to or rather than media recordings), such as reference signature files including a temporally mapped collection of features describing content of an indexed recording that has a temporal dimension corresponding to a timeline of the indexed recording, and each feature may be a description of the content in a vicinity of each mapped timepoint.

The database 134 may also include or store information for each indexed recording. For example, metadata may be stored with each indexed recording that indicates information about the recording, such a length of the recording, a date and time of the recording, a location (e.g., geographic coordinates, or descriptive location like a coffee shop) at which the recording was captured, a name of the recording, or any other identifying or related information to the recording. Within examples in which the indexed recording is a television game show, the additional information may include copies of the questions asked contestants or information for gameplay, answers to the gameplay, an amount of time taken by contestants to answer questions on the game show, or other information related to game play, for example.

The data storage 126 further includes executable instructions 128 for performing a position identification of a sample of content. A position identification indicates an offset into the indexed recording at which the sample of content was taken, for example.

In an example operation, the computing device 104 may capture a sample of ambient content of the computing device 104. In instances in which the computing device 104 is in proximity to the media rendering source 102, the sample of ambient content will include a sample of media rendered by the media rendering source 102. The computing device 104 may send the sample of ambient content over the network 105 to the server 106 to determine a position identification of the sample of ambient content into an indexed recording to which the sample of ambient content matches. The sample of ambient content can be sent as a query from the computing device 104 to the server 106. In response to the query received from the computing device 104, the server 106 identifies the position identification and returns information of the position identification to the computing device 104.

Following, based on the position identification, the computing device 104 synchronizes display of content on the user interface 119 of the computing device 104 to the indexed recording. In addition, a reaction time from an indexed event occurring in the indexed recording to a reaction signal can be computed by the computing device 104 and/or the server 106. The reaction signal is generated by the computing device 104 and is indicative of a user's response to the indexed event.

Generally, the computing device 104 and/or the server 106 may perform functions, as described herein, including a content identification to determine an identity of content in the sample itself or a position identification of the sample of ambient content. Thus, functionality of the system 100 may performed by the server 106, which can receive the sample of ambient content of the computing device 104 from the computing device 104 for processing.

In other examples, functionality of the system 100 may performed by the computing device 104 fully, which records the sample of ambient content, and determines the position identification of the sample of ambient content into the indexed recording to which the sample of ambient content matches. In this regard, the computing device 104 can include a database 136 within the data storage 112, or elsewhere, for storing indexed recordings. The processor(s) 108 may then access the database 136 to determine the position identification, and also to possibly identify an identity of the indexed recording to which the sample of ambient content matches based on a comparison of the sample of ambient content with the stored indexed recordings in the database 136, for example. The database 136 may be similar to the database 134 of the server 106, or may store limited amounts of indexed recordings as received over time, for example.

In further examples, some functions described herein may be performed by the computing device 104 and some functions may be performed by the server 106.

As mentioned, the computing device 104 and/or the server 106 receives a sample of ambient content of the computing device and determines a position identification of the sample into an indexed recording to which the sample of ambient content matches. The position identification is an offset into the indexed recording from where the sample was taken. For example, the offset indicates a time position (Ts) of the sample into the indexed recording. The time position (Ts) may also, in some examples, be an elapsed amount of time from a beginning of the indexed recording. For example, the indexed recording may be a television show, and the time position (Ts) may correspond to an elapsed amount of time of the show at which the computing device 104 captured the sample of ambient content.

The computing device 104 and/or the server 106 may also perform content identifications on the received sample. The content identification identifies a media stream, or identifies information about or related to the media sample. For example, the content identification may indicate an identity of the indexed recording to which the sample matches, and provide information about the indexed recording, including a track name, artist, album, artwork, biography, discography, concert tickets, television program, host of the television program, etc.

Many example techniques may be used to perform the content identification and position identification of the sample of ambient content. For example, for media or audio content identification (e.g., music and television), various content identification methods are known for performing computational content identifications of media samples and features of media samples using a database of known media. The following U.S. patents and publications describe possible examples for media recognition techniques, and each is entirely incorporated herein by reference, as if fully set forth in this description: Kenyon et al, U.S. Pat. No. 4,843,562; Kenyon, U.S. Pat. No. 4,450,531; Haitsma et al, U.S. Patent Application Publication No. 2008/0263360; Wang and Culbert, U.S. Pat. No. 7,627,477; Wang, Avery, U.S. Patent Application Publication No. 2007/0143777; Wang and Smith, U.S. Pat. No. 6,990,453; Blum, et al, U.S. Pat. No. 5,918,223; Master, et al, U.S. Patent Application Publication No. 2010/0145708.

As one example of content and position identification functions, fingerprints of a received sample of content can be matched to fingerprints of an indexed recording by generating correspondences between equivalent fingerprints to locate an indexed recording that has a largest number of linearly related correspondences, or whose relative locations of characteristic fingerprints most closely match the relative locations of the same fingerprints of the indexed recording.

Each fingerprint occurs at a given time, so after matching fingerprints between an indexed recording and the sample, a difference in time between a first fingerprint (of the matching fingerprint in the sample) and a first fingerprint of the indexed media recording will be a time offset of the sample, e.g., amount of time into the indexed recording. In some examples, a sound or program identifier of the matching indexed recording can then be identified to determine an identity of the sample of content and an offset of the sample of content into the identified indexed recording.

Figure 2:
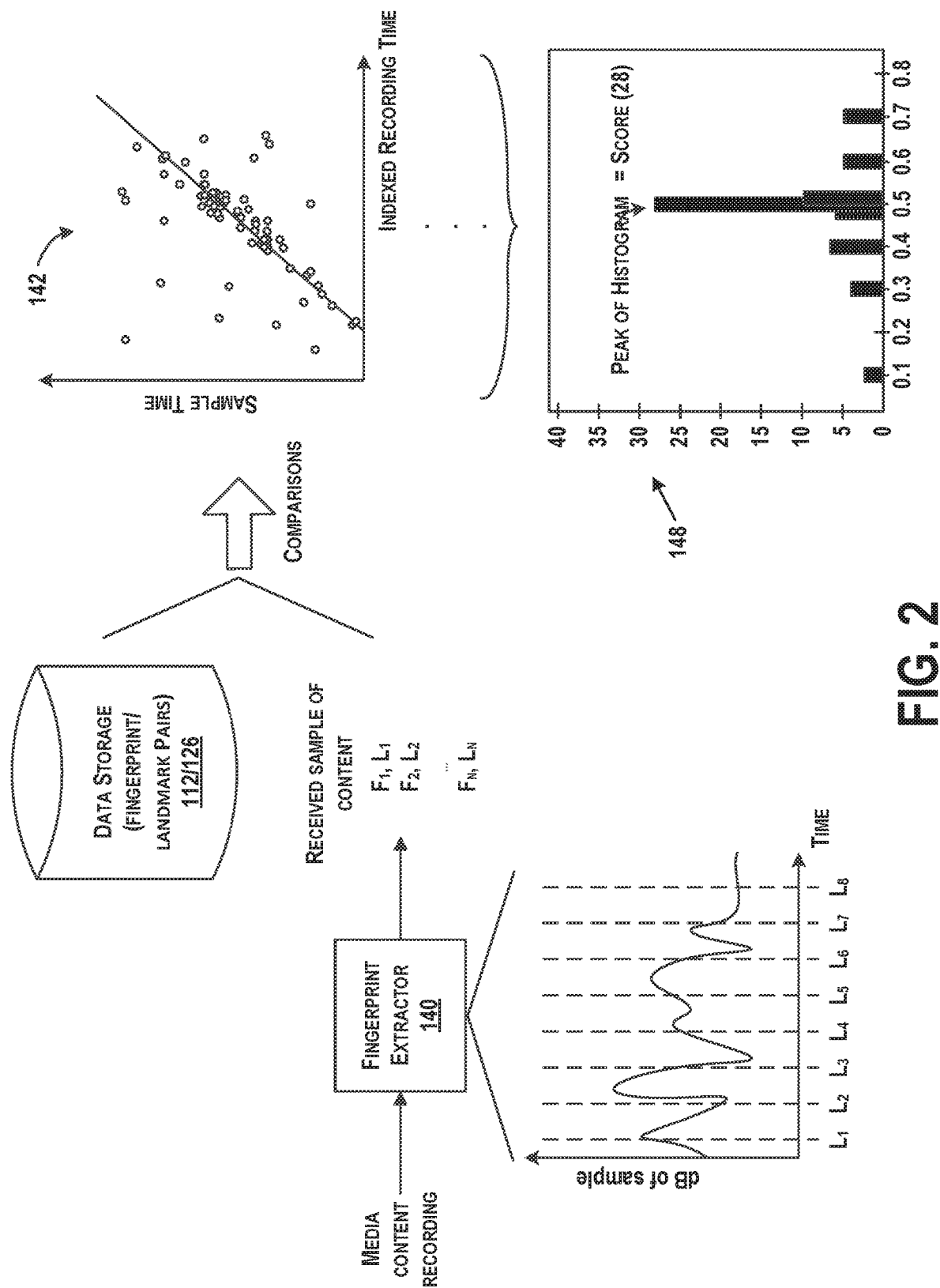
FIG. 2 illustrates an example diagram for performing a content and/or position identification of a sample of content, according to an example implementation.

FIG. 2 illustrates an example diagram for performing a content and/or position identification of a sample of content, according to an example implementation. Functions shown and described with respect to FIG. 2 may be implemented by the computing device 104 and/or by the server 106. Thus, components shown in FIG. 2 may be included within the computing device 104 and/or the server 106. In addition, components shown in FIG. 2 may be implemented with a processor executing instructions to perform functions described.

Initially, the sample of content is input to a fingerprint extractor 140 that computes characteristics or fingerprints of the media recordings. An example plot of dB (magnitude) of a sample vs. time is shown, and the plot illustrates a number of identified landmark positions ($L_1$ to $L_8$) in the sample.

Particular locations within the sample at which fingerprints are computed may depend on reproducible points in the sample. Such reproducibly computable locations are referred to as "landmarks." One landmarking technique, known as Power Norm, is to calculate an instantaneous power at many time points in the recording and to select local maxima. One way of doing this is to calculate an envelope by rectifying and filtering a waveform directly. Another way is to calculate a Hilbert transform (quadrature) of a signal and use a sum of magnitudes squared of the Hilbert transform and the original signal. Other methods for calculating landmarks may also be used.

Once the landmarks have been determined, a fingerprint is computed at or near each landmark time point in the recording. The fingerprint is generally a value or set of values that summarizes a feature or a set of features in the recording at or near the landmark time point. In one example, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks. In one example, to generate spectral slice fingerprints, a frequency analysis is performed in the neighborhood of each landmark timepoint to extract the top several spectral peaks. A fingerprint value may then be the single frequency value of a strongest spectral peak. For more information on calculating characteristics or fingerprints of audio samples, the reader is referred to U.S. Pat. No. 6,990,453, the entire disclosure of which is herein incorporated by reference as if fully set forth in this description.

The fingerprint extractor 140 may generate a set of fingerprints each with a corresponding landmark and provide the fingerprint/landmark pairs for the sample of content to the data storage 112/126 of the computing device 104 and/or the server 106, respectively. For example, fingerprint and landmark pairs ($F_1/L_1$, $F_2/L_2$, ..., $F_n/L_n$) can be determined for the sample of content. The fingerprints and landmark pairs may be represented in the data storage 112/126 as key-value pairs where the key is the fingerprint and the value is a corresponding landmark.

After indexing the sample of content, the computing device 104 and/or the server 106 then uses the indexed sample to compare against indexed recordings stored in the database 134/136 to identify which of the indexed recordings has any matching portions to any of the indexed samples. The indexed recordings may be indexed in the same manner in which fingerprint and landmark pairs of a recording are generated and stored with a unique identifier (e.g., sound_ID or program_ID).

Thus, the computing device 104 and/or the server 106 compares the fingerprint and landmark pairs of the sample to the fingerprint and landmark pairs of the indexed recordings to identify matches. To identify matches, fingerprints of a sample can be matched to fingerprints of indexed recordings by generating correspondences between equivalent fingerprints (or substantially equivalent fingerprints) to locate an indexed recording that has a number of linearly related correspondences to the sample, or whose relative locations of characteristic fingerprints most closely match the relative locations of the same fingerprints of the sample.

Referring to FIG. 2, a scatter plot 142 of landmarks of the sample and an indexed recording at which fingerprints match (or substantially match) is illustrated, according to an example implementation. After generating the scatter plot 142, linear correspondences between the landmark pairs can be identified, and sets can be scored according to the number of pairs that are linearly related. A linear correspondence may occur when a statistically significant number of corresponding sample locations and indexed recording locations can be described with substantially the same linear equation, within an allowed tolerance, for example.

In one example, a histogram 148 of offset values of matching fingerprint/landmark pairs of the sample to the indexed recordings can be generated. The offset values may be differences in landmark time positions between the sample and the indexed recording where a fingerprint matches. Thus, the offset indicates a position into the indexed recording where the sample matches. FIG. 2 illustrates an example histogram 148 of offset values. The offset value having a peak of the histogram (e.g., score=28 in FIG. 2) is a winning time offset, indicating the time offset to use for the matched sample. Each sample can be processed in this manner to perform a position identification and to generate a time offset.

Other forms of media sample comparison may also be performed depending on a type of the sample. For example, a video identification algorithm may be used to identify a position within a video stream (e.g., a movie). An example video identification algorithm is described in Oostveen, J., et al., "Feature Extraction and a Database Strategy for Video Fingerprinting", Lecture Notes in Computer Science, 2314, (Mar. 11, 2002), 117-128, the entire contents of which are herein incorporated by reference. For example, a position of a video sample into a video recording can be derived by determining which video frame was identified. To identify the video frame, frames of the media sample can be divided into a grid of rows and columns, and for each block of the grid, a mean of the luminance values of pixels is computed. A spatial filter can be applied to the computed mean luminance values to derive fingerprint bits for each block of the grid. The fingerprint bits can be used to uniquely identify the frame, and can be compared or matched to fingerprint bits of a database that includes known media. The extracted fingerprint bits from a frame may be referred to as sub-fingerprints, and a fingerprint block is a fixed number of sub-fingerprints from consecutive frames. Using the sub-fingerprints and fingerprint blocks, identification of video samples can be performed. Based on which frame the media sample included, a position into the video (e.g., time offset) can be determined.

Furthermore, other forms of content and/or position identification and matching may also be performed, such as using watermarking methods. A watermarking method can be used to determine a time offset in instances in which the indexed recordings and associated samples may have embedded watermarks at intervals, and each watermark specifies a time or position of the watermark either directly, or indirectly via a database lookup, for example. If the indexed recording includes embedded watermarks that indicate, either directly or indirectly, a time or position offset value, the computing device 104 may determine the time offset of a sample into the indexed recordings.

Within examples, once the position identification of the sample of ambient content into the indexed recording is determined, display of content on the user interface 119 of the computing device 104 can be synchronized to the indexed recording at the offset of the position identification. For example, referring to FIG. 1, the processor(s) 108 can retrieve from the data storage 112, or receive from the server 106, content for display on the user interface 119 of the display 118, and the content is synchronized to playout of the indexed recording that is being rendered by the media rendering source 102. Following, a reaction time from an indexed event occurring in the indexed recording to a reaction signal can be computed. The reaction signal generated by the computing device and indicative of a user's response to the indexed event.

Figure 3:
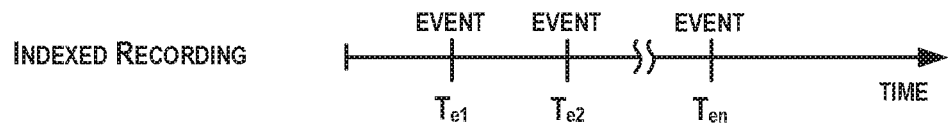
FIG. 3 is an example timeline of an indexed recording, according to an example implementation.

FIG. 3 is an example timeline of an indexed recording, according to an example implementation. The indexed recording is shown as having indexed events at timepoints throughout the indexed recording. For example, indexed events occur at timepoints $T_{e1}$, $T_{e2}$, . . . , $T_{en}$. Any number of indexed events may be included in the indexed recording.

The indexed recording can be pre-indexed and stored on the computing device 104 and/or on the server 106, and the indexed event can be encoded manually for association to a specific timepoint in the indexed recording.

In one example, the indexed recording is a recorded game show and it is indexed with fingerprint and landmark pairs for use in content and position identification as described above. The indexed recording then has the indexed events associated with the indexed recording at the relevant timepoints. The indexed events can refer to a timepoint in the game show of gameplay starting or occurring. For example, in a game show where contestants are asked questions by a host, the indexed event refers to a timepoint in the recorded game show of when the host begins to ask questions. In this way, by synchronizing display of content associated with the game show on the user interface 119 of the display 118 of the computing device 104, a user can play along with the contestants at home.

In other examples, the indexed event may trigger functionality of the user interface 119. For example, upon encountering the indexed event timepoint in the indexed recording, the computing device 104 may cause provide to the user interface 119 of the computing device 104 information associated with the indexed event. When the indexed recording includes a game show, and the indexed event includes gameplay of the game show, then the information associated with the indexed event can include providing possible answers to the gameplay of the game show. A user of the computing device 104 can be watching the game show on the television, and then play along on their computing device 104. Thus, after presenting the possible answers, the user interface 119 of the computing device 104 can receive a selection of content from the possible answers, and the computing device 104 generates the reaction signal. Following, a reaction time from the indexed event occurring in the indexed recording to the reaction signal is computed. This can include determining an amount of time between the indexed event occurring and receipt of the selection of content. The reaction time quantifies how long it took the user to answer the question or complete an instance of game play on the game show, for example.

Figure 4:
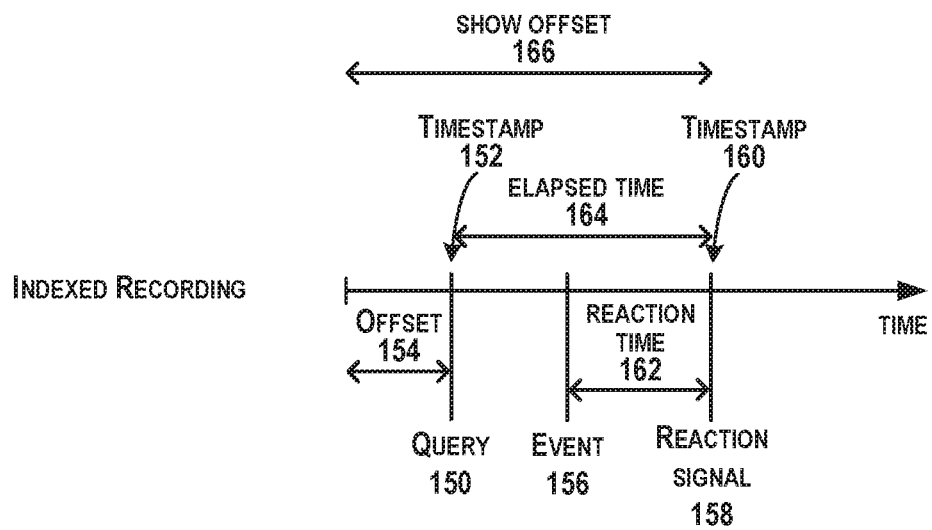
FIG. 4 is an example timeline illustrating events occurring along the indexed recording, according to an example implementation.

FIG. 4 is an example timeline illustrating events occurring along the indexed recording, according to an example implementation. In the example shown in FIG. 4, a user may turn on the television and begin watching a game show. The game show is the indexed recording shown in FIG. 4. The user may utilize the computing device 104 to capture a recording of a sample of ambient content, which will record a sample of the game show. The computing device 104 then performs a query 150 to determine the position identification of the sample of ambient content into the gameshow, as described above. The query 150 may have an associated timestamp 152 of occurrence, and the position identification determines an offset 154 as described above. Then, based on the position identification, display of content on the user interface 119 of the computing device 104 is synchronized to the game show. The amount and type of content displayed on the user interface 119 may not be the game show itself, but rather, includes information associated with or used during gameplay of the game show.

At some point in the indexed recording, an indexed event 156 occurs. At that time, the user interface 119 displays information associated with the game play of the game show, and a user makes a selection causing generation of a reaction signal 158 thereafter. The information may be display on a touchscreen, and the selection can be made by an answer/button press on the touchscreen, for example. The reaction signal 158 thus has an associated timestamp 160. Then, the reaction time 162 from the indexed event 156 occurring in the indexed recording to the reaction signal 158 is computed.

Figure 5:
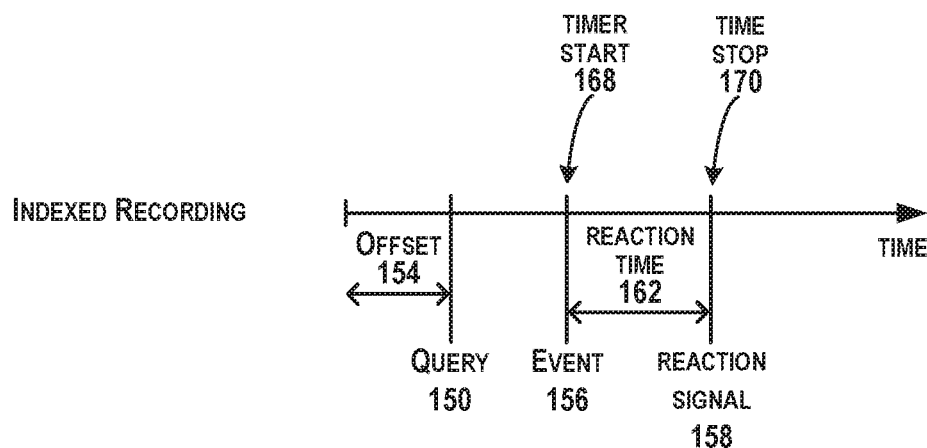
FIG. 5 is another example timeline illustrating events occurring along the indexed recording, according to an example implementation.

In one example, to compute the reaction time 162, initially, an elapsed time 164 between the reaction signal 158 (or timestamp 160 of the reaction signal 158) and the timestamp 152 at which the sample of ambient content was recorded and queried is determined. Following, the offset 154 into the indexed recording where the sample was taken is added to the elapsed time to determine a show offset 166. Lastly, a time of the indexed event 156 occurring is subtracted from the show offset 166 to determine the reaction time 162. This computation is shown below.

answer button press timestamp−initial timestamp=elapsed time offset+elapsed time=show offset show offset−event time=reaction time FIG. 5 is another example timeline illustrating events occurring along the indexed recording, according to an example implementation. As shown in FIG. 5, as another way to compute the reaction time 162, initially a timer can be started at a time 168 of the indexed event occurring and stopped 170 at a receipt of the reaction signal 158. The computing device 104 and/or the server 106 may operate the timer functionality. Then, an elapsed time of the timer is the reaction time 162.

Once the reaction time 162 is computed, a number of follow-on actions and functionality of the computing device 104 and/or server 106 can occur. For example, the user interface 119 can receive a responsive communication indicating whether the selection of content matched an answer to the indexed event. As another example, the user interface 119 can receive a responsive communication to the selection of content indicating a correct selection of content that matched an answer to the indexed event.

Figure 6:
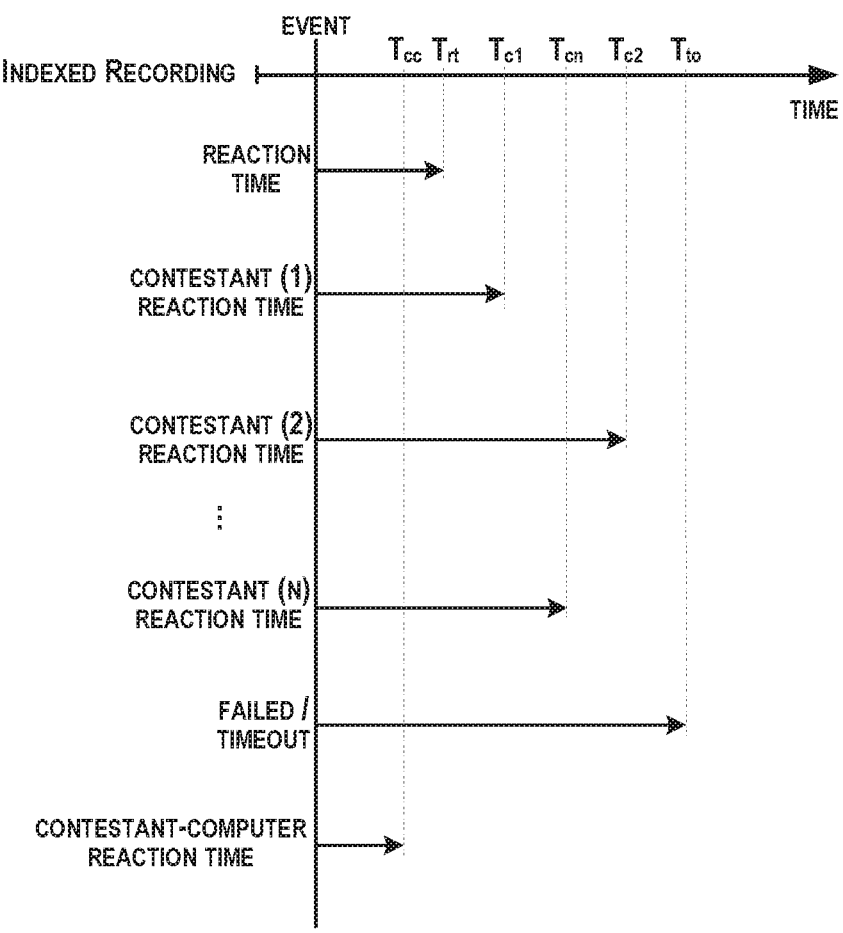
FIG. 6 is an example timeline illustrating time events occurring along the indexed recording, according to an example implementation.

FIG. 6 is an example timeline illustrating time events occurring along the indexed recording, according to an example implementation. As shown, the event occurs at a timepoint, and the reaction time ($T_{rt}$) is computed. Similarly, a reaction time of contestants on the game show on television can also be determined or indexed as $T_{c1}, T_{c2}, \ldots, T_{cn}$. Then, the computing device 104 and/or the server 106 can compare the reaction time of the user of the computing device 104 with the reaction times $T_{c1}, T_{c2}, \ldots, T_{cn}$ taken by the contestants to provide an answer to the gameplay, and a determination of which of the contestants or the user of the computing device 104 has a lowest reaction time can be made. The comparison can be used for scoring purposes or to award points to the user on the user interface 119, for example.

In one example, gameplay may include a number of rounds of questioning, and a final round may include a computer/machine becoming a contestant on the game show, which will have an associated reaction time $T_{cc}$. When the computer-programmed device acts as a contestant, the computing device 104 and/or the server 106 can compare the reaction time of the user of the computing device 104 with a reaction time taken by the computer-programmed device to provide an answer to the gameplay, and determine which of the computer-programmed device or the user of the computing device has a lowest reaction time.

In the example shown in FIG. 6, the user has a reaction time faster than contestants 1, 2, . . . , n, but slower than the contestant-computer reaction time.

An additional time event may include a failed/timeout event at $T_{fo}$. The reaction time can be compared against the failed/timeout event time, and when the reaction time is longer than the failed/timeout event time, a responsive communication may be received at the user interface 119 indicating failure to provide a correct answer within the allotted time period. For example, based on not receiving the selection of content from the information associated with the indexed event within a default timespan, the user interface 119 of the computing device 104 receives a responsive communication indicating a correct selection of content that matched an answer to the indexed event.

In one further example, if the reaction signal is not received prior to a contestant on the game show providing an answer to the gameplay, then the user interface 119 of the computing device 104 may receive a responsive communication indicating a correct selection of content that matched an answer to the indexed event. Here, if the contestant answers before the user of the computing device 104, the user may be timed-out.

Figure 7C:
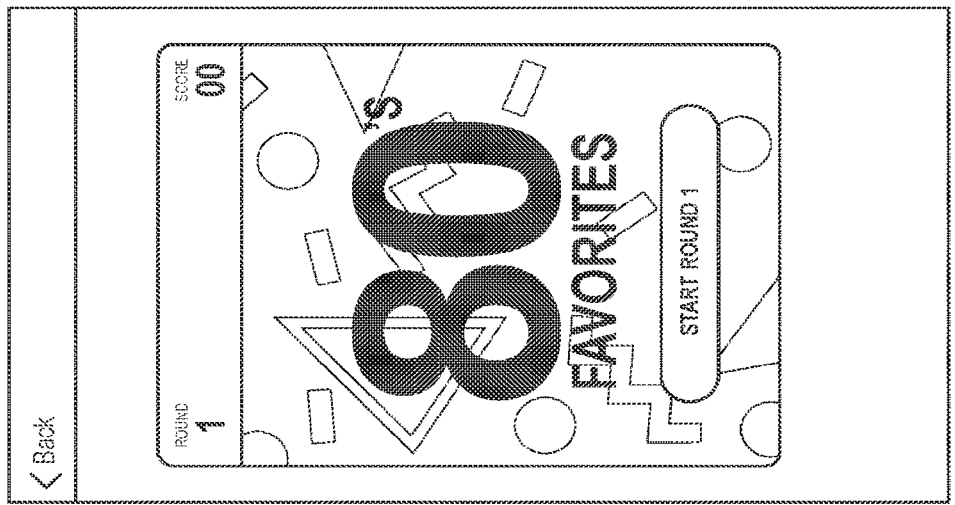
FIGS. 7A-7L illustrate example displays of the user interface as synchronized with the indexed recording, according to an example implementation.
Figure 7B:
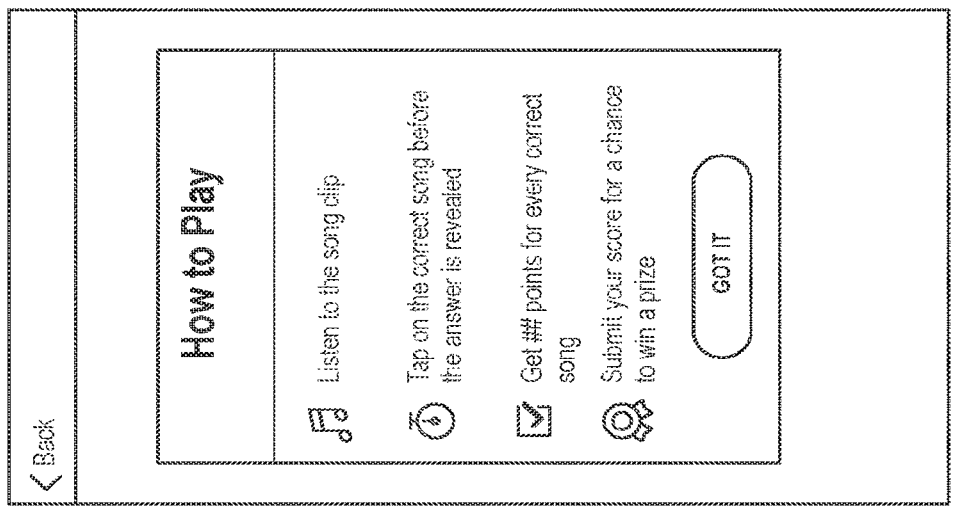
Figure 7A:
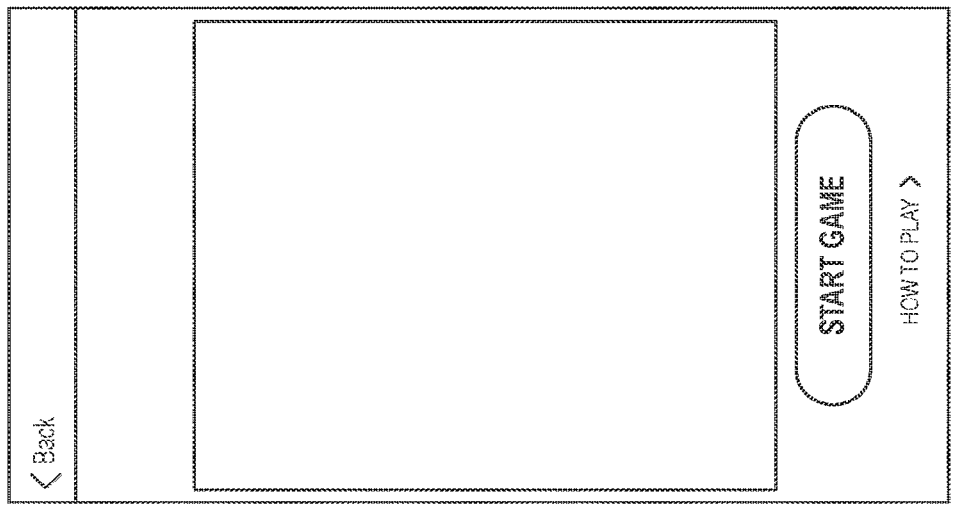

FIGS. 7A-7L illustrate example displays of the user interface 119 as synchronized with the indexed recording, according to an example implementation. In FIG. 7A, the user interface 119 displays an interstitial page after performing an initial query by the computing device 104. Here, the initial query is performed by the computing device 104 recording a sample of ambient content of the game show being played on the television, and the content and/or position identification are determined to identify the show. The user interface 119 is then associated with the game show to display corresponding content. The content may be received from the server 106 and/or retrieved from the data storage 112 of the computing device 104. A user may select "how to play" to view an instructional card, and then select "start game" to initiate the gameplay experience.

In FIG. 7B, the user interface 119 illustrates the instructional card including instructions for playing the game. In FIG. 7C, the user has started the game, and lands on a category/round card and may begin the round by selecting "start round 1".

The user interface 119 is now synchronized to the game play of the indexed recording, and upon occurrence of an indexed event, information for display is provided to the user interface 119. For example, the event may include playing a song and contestants are challenged to name the title of the song. Thus, upon occurrence of the indexed event, the user interface 119 receives selections of content for display. In FIG. 7D, the selections of content are shown as display by the user interface 119. The user, watching the television and listening to the song being played, attempts to guess the title of the song by making a selection. In FIG. 7E, the user interface 119 is shown as being locked with the user's selection, and the interface is locked until the correct answer is revealed in the game show.

Figure 7F:
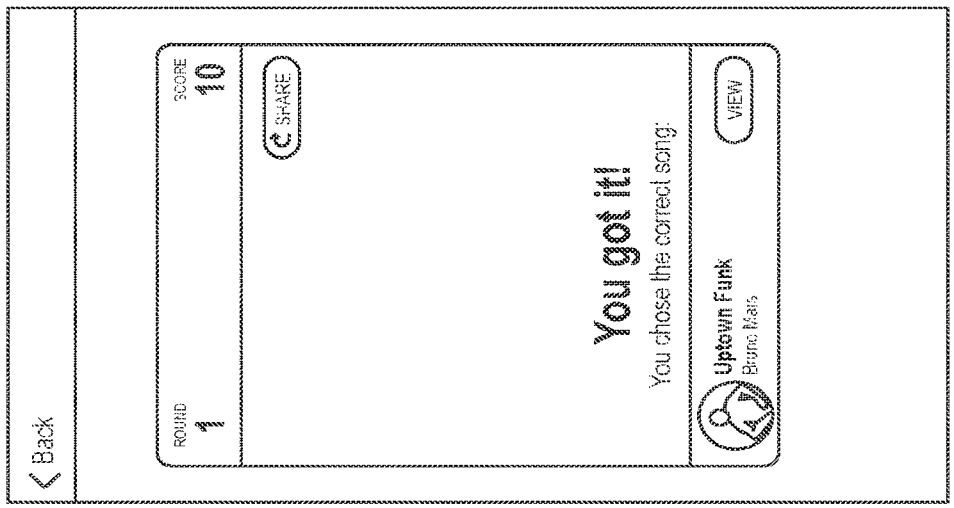
Figure 7E:
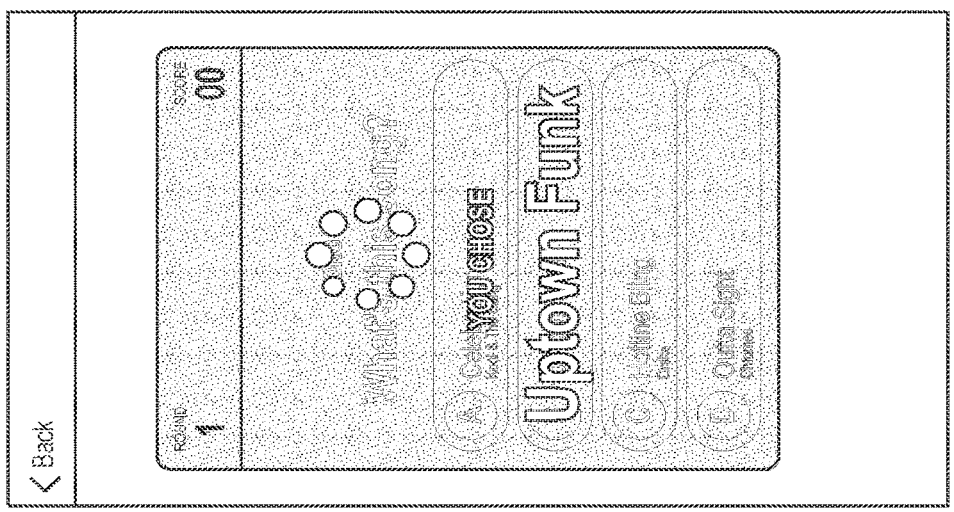
Figure 7D:
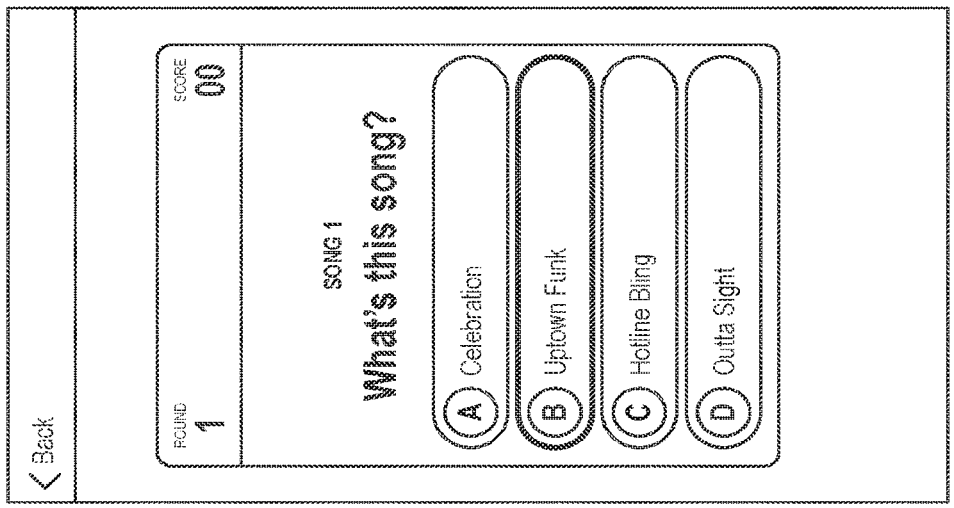
Figure 7G:
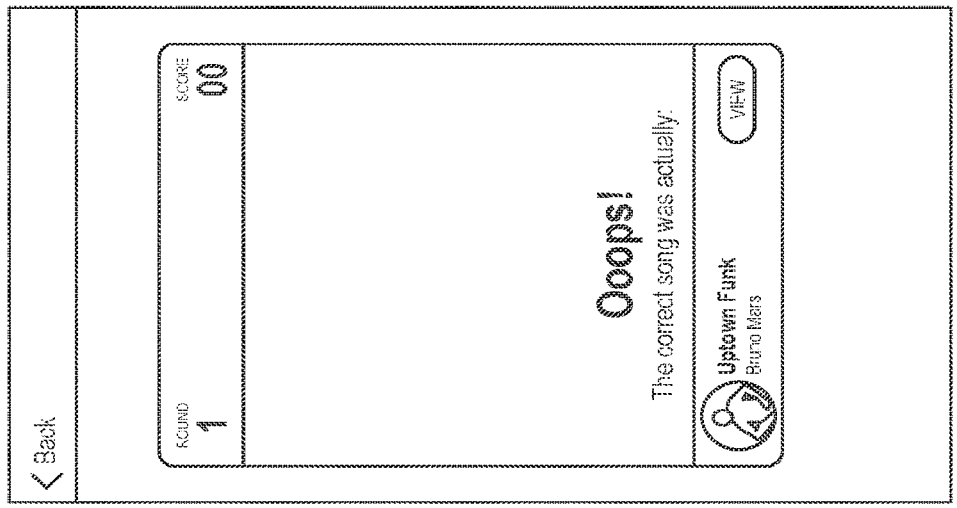

In FIG. 7F, the user interface 119 displays the illustration if the user selects the correct answer, and an animation is shown and points are added to their score. In FIG. 7G, the user interface 119 displays the illustration if the user selects the incorrect answer, and an animation is shown and no points are added to their score.

Figure 7H:
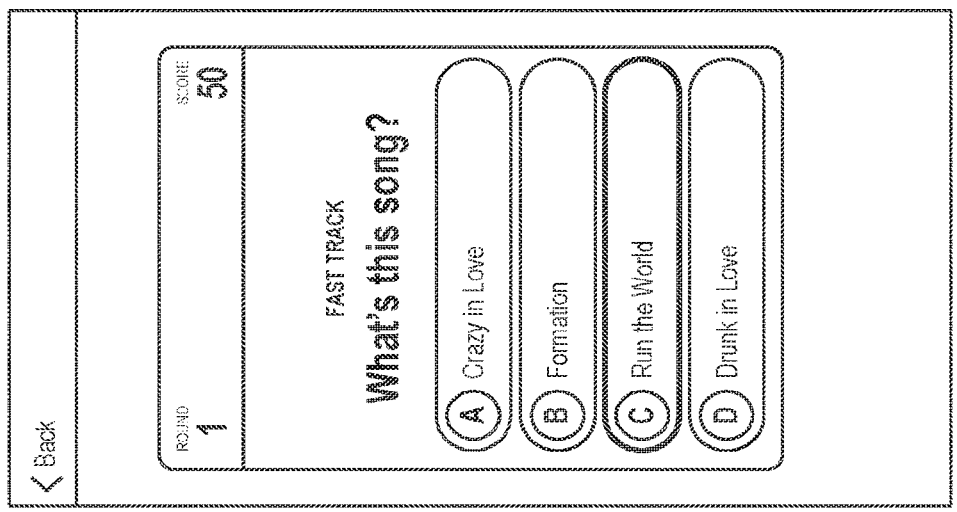

For the example game play shown in FIGS. 7A-7L, at an end of each category, a user will be prompted to answer a timed question to beat the computer-programmed contestant. In FIG. 7H, the user interface 119 displays an example illustration of the timed question.

Figure 7I:
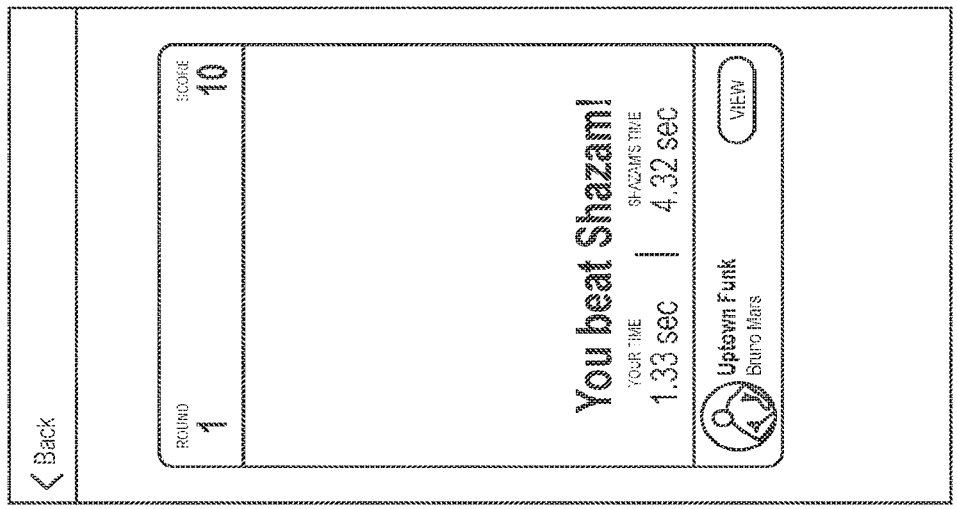

In FIG. 7I, the user interface 119 is shown illustrating an outcome of the user selecting the correct answer and beating the computer-programmed contestant. The user interface 119 will display an animation and add the corresponding points, as well as illustrate the reaction time of the user and the time taken by the computer-programmed contestant.

Figure 7L:
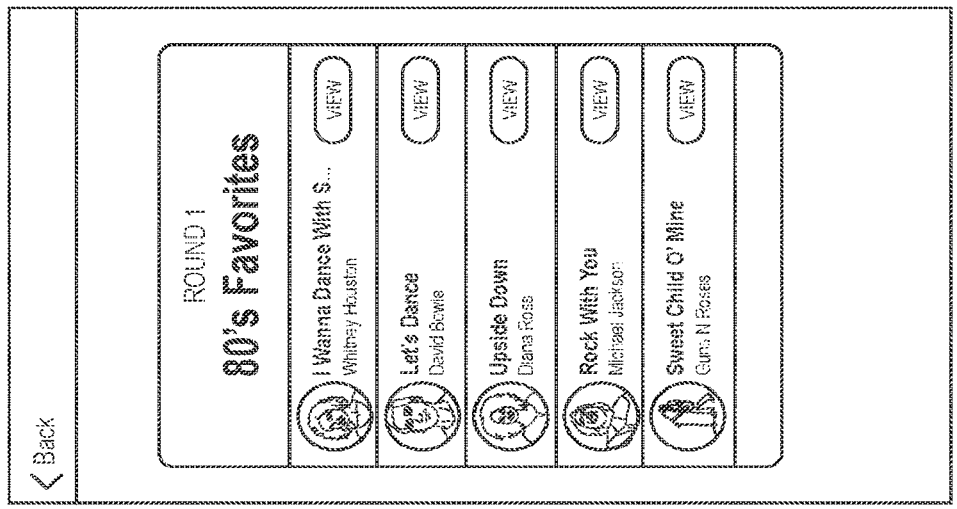
Figure 7K:
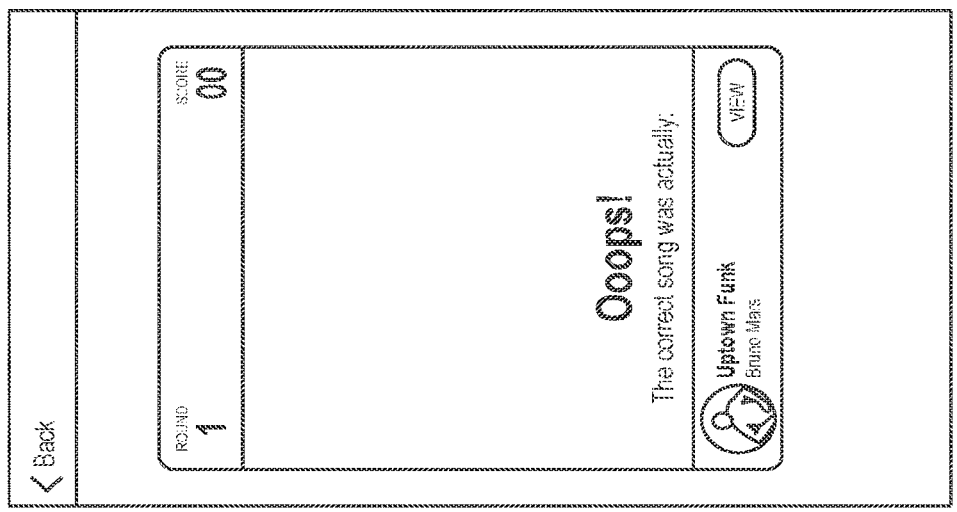
Figure 7J:
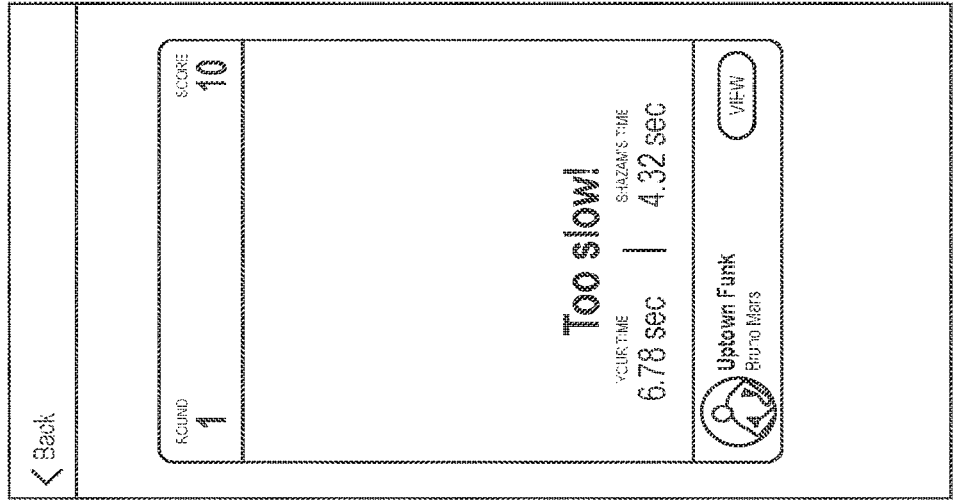

In FIG. 7J, the user interface 119 is shown illustrating an outcome of the user selecting the correct answer, but not beating the computer-programmed contestant. The user interface 119 will display an animation and not add the corresponding points, as well as illustrate the reaction time of the user and the time taken by the computer-programmed contestant.

In FIG. 7K, the user interface 119 is shown illustrating an outcome of the user selecting the incorrect answer of the timed question competition against the computer-programmed contestant. The user interface 119 will display an animation and not add the corresponding points.

In FIG. 7L, the user interface 119 is shown illustrating a recap of all songs in each category for each round, for example.

Figure 8:
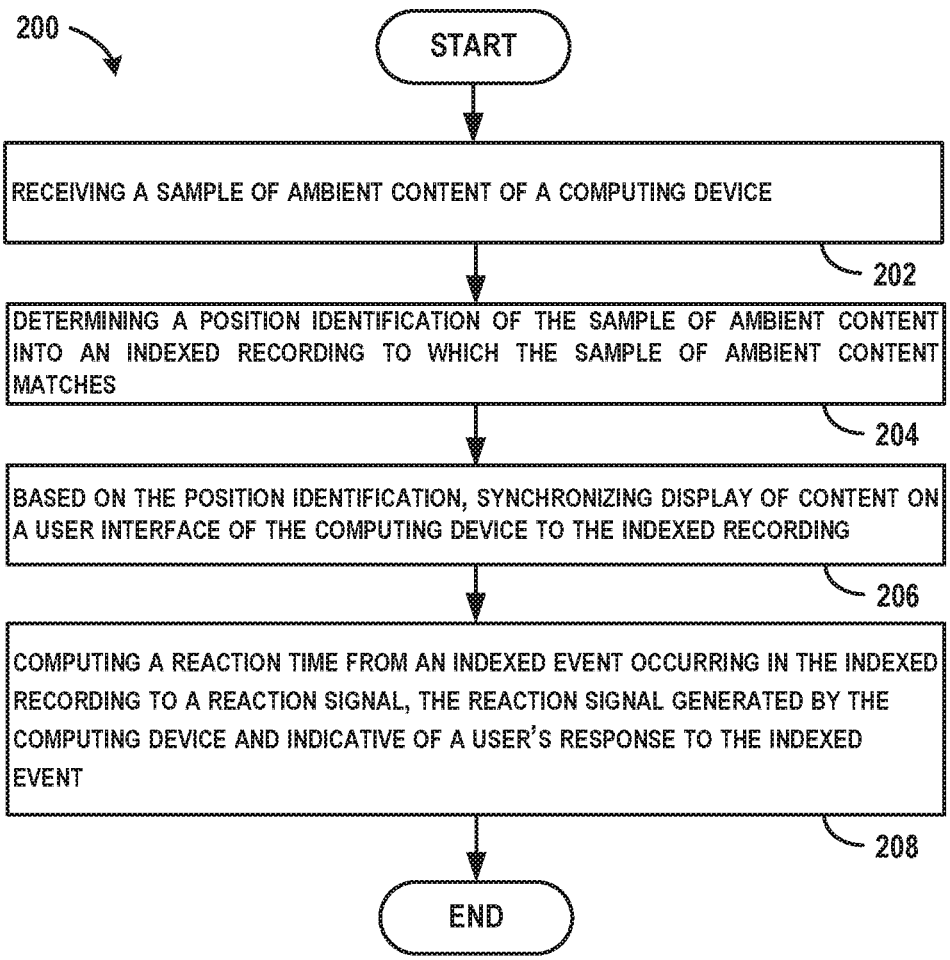
FIG. 8 shows a flowchart of an example method of computing the reaction time from the indexed event occurring in the indexed recording to the reaction signal, according to an example implementation.

FIG. 8 shows a flowchart of an example method of computing the reaction time from the indexed event occurring in the indexed recording to the reaction signal, according to an example implementation. Method 200 shown in FIG. 8 presents an embodiment of a method that could be used with or performed by the system 100 shown in FIG. 1, or the computing device 104 and/or the server 106 shown in FIG. 1, for example. Further, devices or systems may be used or configured to perform logical functions presented in FIG. 8. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 8, and within other processes and methods disclosed herein, may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes receiving a sample of ambient content of the computing device 104. At block 204, the method 200 includes determining a position identification of the sample of ambient content into an indexed recording to which the sample of ambient content matches. At block 206, the method 200 includes based on the position identification, synchronizing display of content on the user interface 119 of the computing device 104 to the indexed recording. At block 208, the method 200 includes computing a reaction time from an indexed event occurring in the indexed recording to a reaction signal. The reaction signal is generated by the computing device and indicative of a user's response to the indexed event.

Within examples, the sample of ambient content of the computing device 104 is a sample of ambient audio of the computing device 104, and the ambient audio includes audio from a television game show.

In one example, the method 200 is performed by the server 106, and the server 106 receives the sample of ambient content of the computing device 104 from the computing device 104. In another example, the method is performed by the computing device 104, the computing device 104 determines the position identification of the sample of ambient content into the indexed recording to which the sample of ambient content matches, and identifies the indexed recording to which the sample of ambient content matches as well based on a comparison of the sample of ambient content with stored indexed recordings in the database 136 on the computing device 104.

Figure 9:
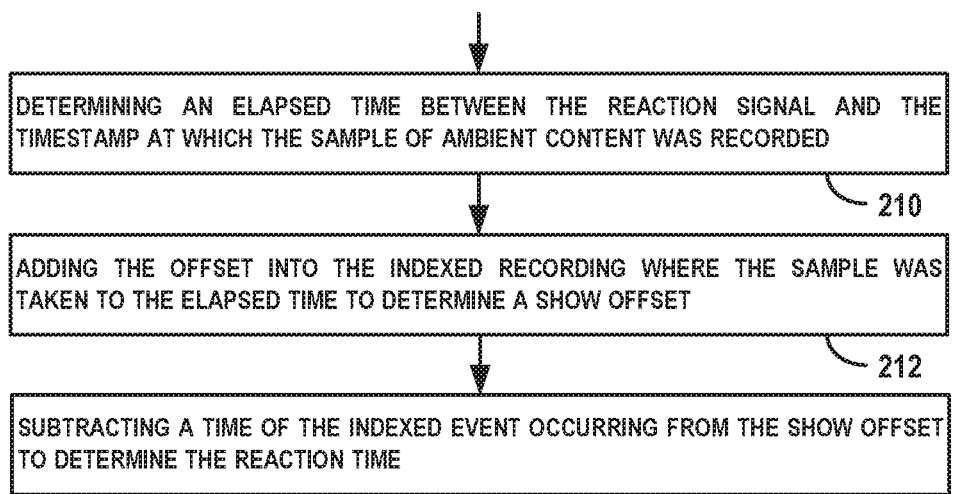
FIG. 9 shows a flowchart of an example method that may be used with the method of FIG. 8, according to an example implementation.

FIG. 9 shows a flowchart of an example method that may be used with the method 200 of FIG. 8, according to an example implementation. As shown at blocks 210-212, additional functions for computing the reaction time can include determining an elapsed time between the reaction signal and the timestamp at which the sample of ambient content was recorded, adding the offset into the indexed recording where the sample was taken to the elapsed time to determine a show offset, and subtracting a time of the indexed event occurring from the show offset to determine the reaction time.

Figure 10:
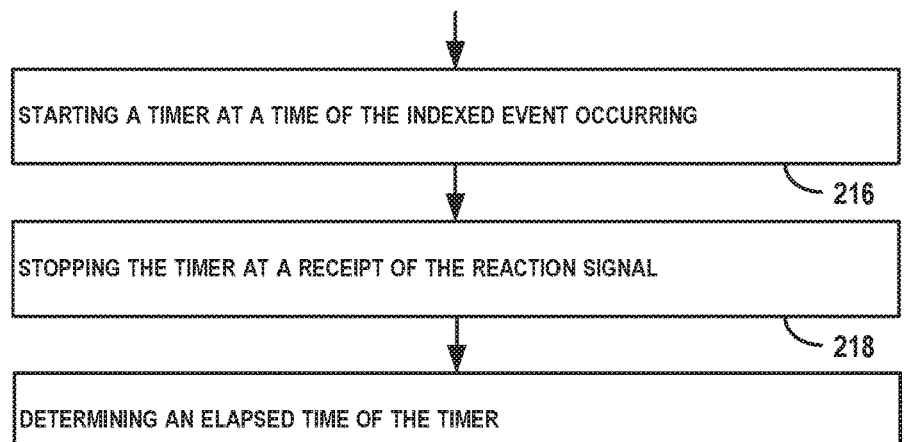
FIG. 10 shows a flowchart of an example method that may be used with the method of FIG. 8, according to an example implementation.

FIG. 10 shows a flowchart of an example method that may be used with the method 200 of FIG. 8, according to an example implementation. As shown at blocks 216-220, additional functions for computing the reaction time can include starting a timer at a time of the indexed event occurring, stopping the timer at a receipt of the reaction signal, and determining an elapsed time of the timer.

Figure 11:
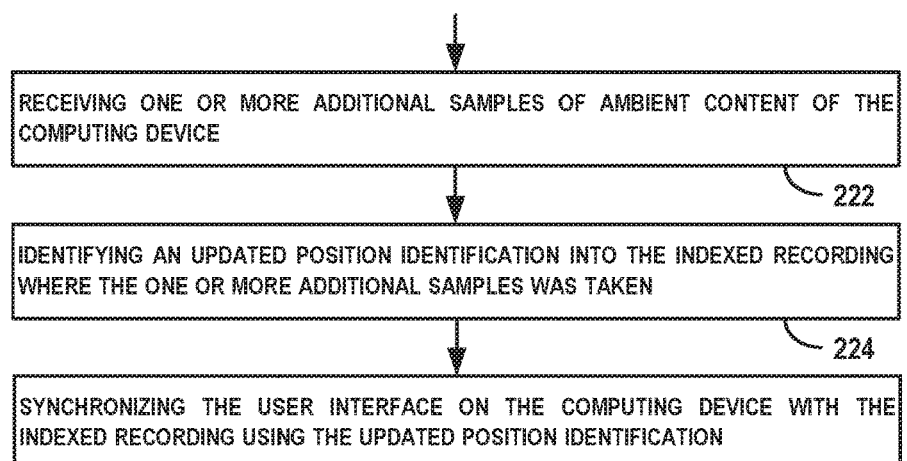
FIG. 11 shows a flowchart of an example method that may be used with the method of FIG. 8, according to an example implementation.

FIG. 11 shows a flowchart of an example method that may be used with the method 200 of FIG. 8, according to an example implementation. As shown at blocks 222-226, additional functions can include receiving one or more additional samples of ambient content of the computing device 104, identifying an updated position identification into the indexed recording where the one or more additional samples was taken, and synchronizing the user interface 119 on the computing device 104 with the indexed recording using the updated position identification. In this example, the computing device 104 may poll in the background by recording samples continuously or at periodic intervals and then determining the position identification of the newly recorded samples to resynchronize the user interface 119 display to the indexed recording. In examples in which the server 106 receives the sample from the computing device 104 and performs the position identification, the server 106 may receive with a selection of content during gameplay, a new sample of ambient content of the computing device 104 as well to perform an updated position identification.

Figure 12:
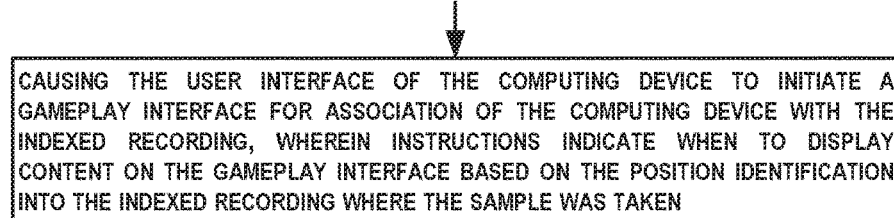
FIG. 12 shows a flowchart of an example method that may be used with the method of FIG. 8, according to an example implementation.

FIG. 12 shows a flowchart of an example method that may be used with the method 200 of FIG. 8, according to an example implementation. As shown at block 228, additional functions include causing the user interface 119 of the computing device 104 to initiate a gameplay interface (e.g., as shown in FIGS. 7A-7L) for association of the computing device 104 with the indexed recording, and the instructions indicate when to display content on the gameplay interface based on the position identification into the indexed recording where the sample was taken. The server 106 may send the instructions to the computing device 104, and/or the computing device 104 may execute the instructions from those stored in the data storage 112.

Figure 13:
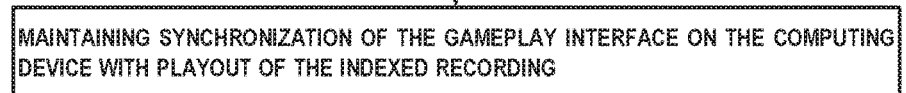
FIG. 13 shows a flowchart of an example method that may be used with the method of FIG. 8, according to an example implementation.

FIG. 13 shows a flowchart of an example method that may be used with the method 200 of FIG. 8, according to an example implementation. As shown at block 230, additional functions include maintaining synchronization of the gameplay interface on the computing device 104 with playout of the indexed recording. To maintain synchronization, additional samples of content may be recorded and processed, for example.

Figure 14:
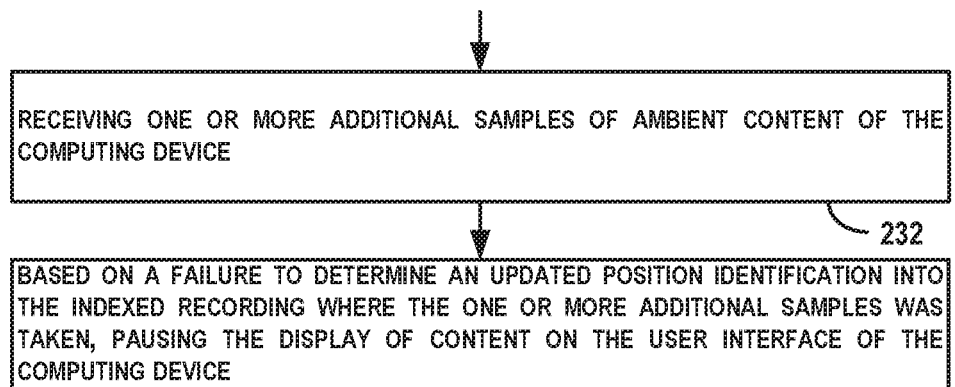
FIG. 14 shows a flowchart of an example method that may be used with the method of FIG. 8, according to an example implementation.

FIG. 14 shows a flowchart of an example method that may be used with the method 200 of FIG. 8, according to an example implementation. As shown at blocks 232-234, additional functions include receiving one or more additional samples of ambient content of the computing device 104, and based on a failure to determine an updated position identification into the indexed recording where the one or more additional samples was taken, pausing the display of content on the user interface 119 of the computing device 104. In this example, the user may be watching the television game show as a recorded on a digital video recorder, and may pause the television. In such a scenario, no television audio is played, and when the computing device 104 captures and records a sample of ambient audio, the computing device 104 and/or the server 106 will fail to determine an updated position identification into the indexed recording using the new sample. Thus, the computing device 104 may pause the display of content on the user interface 119 as well to pause gameplay.

Figure 15:
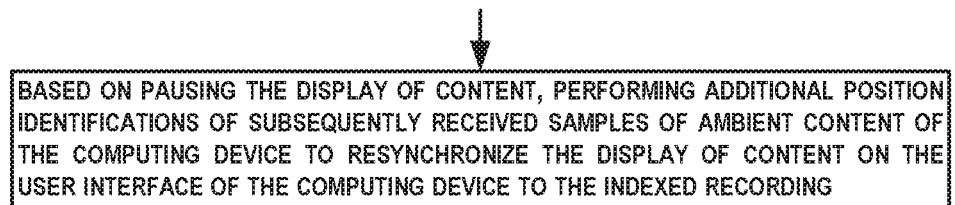
FIG. 15 shows a flowchart of an example method that may be used with the method of FIG. 14, according to an example implementation.

FIG. 15 shows a flowchart of an example method that may be used with the method 200 of FIG. 14, according to an example implementation. As shown at block 236, additional functions for based on pausing the display of content, performing additional position identifications of subsequently received samples of ambient content of the computing device 104 to resynchronize the display of content on the user interface 119 of the computing device 104 to the indexed recording. Thus, once the pause has occurred, the computing device 104 may be programmed to record ambient samples of content more frequently so as to determine an updated position identification which would indicate that the television game show has been restarted. Then, when the game show is restarted, the computing device 104 will need to resynchronize the display of content of the user interface 119 to the indexed recording.

Figure 16:
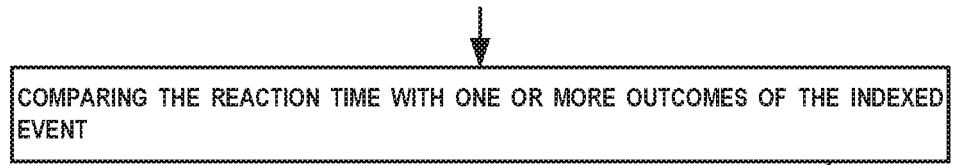
FIG. 16 shows a flowchart of an example method that may be used with the method of FIG. 8, according to an example implementation.

FIG. 16 shows a flowchart of an example method that may be used with the method 200 of FIG. 8, according to an example implementation. As shown at block 238, additional functions for comparing the reaction time with one or more outcomes of the indexed event. Example outcomes of the indexed event are shown and described with reference to FIG. 6, for example.

Figure 17:
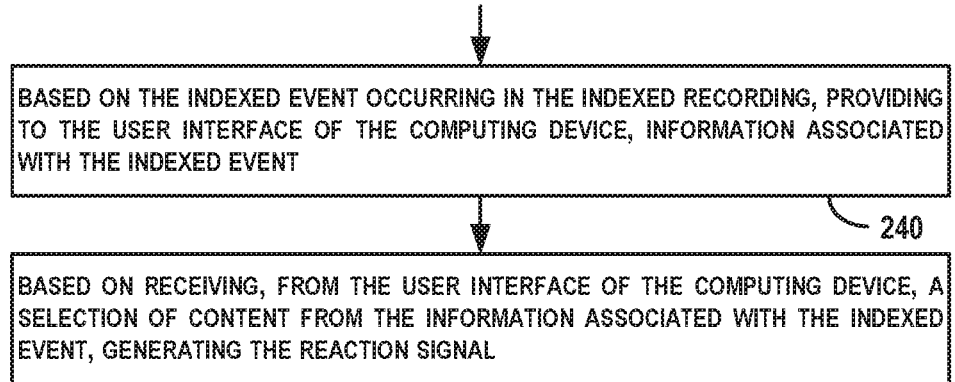
FIG. 17 shows a flowchart of an example method that may be used with the method of FIG. 8, according to an example implementation.

FIG. 17 shows a flowchart of an example method that may be used with the method 200 of FIG. 8, according to an example implementation. As shown at blocks 240-242, additional functions for based on the indexed event occurring in the indexed recording, providing to the user interface 119 of the computing device 104 information associated with the indexed event, and based on receiving, from the user interface 119 of the computing device 104, a selection of content from the information associated with the indexed event, generating the reaction signal. Examples of providing information associated to with the indexed event are shown and described with reference to FIG. 7D, for example.

FIG. 18 shows a flowchart of an example method that may be used with the method 200 of FIG. 8, according to an example implementation. As shown at block 244, additional functions for determining an amount of time between the indexed event occurring and receipt of the selection of content.

FIG. 19 shows a flowchart of an example method that may be used with the method 200 of FIG. 8, according to an example implementation. As shown at block 246, additional functions for receiving, at the user interface 119 of the computing device 104, a responsive communication to the selection of content indicating whether the selection of content matched an answer to the indexed event. Examples of such responsive communication are shown and described with reference to FIG. 7F-7G, for example.

FIG. 20 shows a flowchart of an example method that may be used with the method 200 of FIG. 8, according to an example implementation. As shown at block 248, additional functions for receiving, at the user interface 119 of the computing device 104, a responsive communication to the selection of content indicating a correct selection of content that matched an answer to the indexed event. Examples of such responsive communication are shown and described with reference to FIG. 7F, for example.

FIG. 21 shows a flowchart of an example method that may be used with the method 200 of FIG. 8, according to an example implementation. As shown at block 250, additional functions for based on not receiving the selection of content from the information associated with the indexed event within a default timespan, receiving, at the user interface 119 of the computing device 104, a responsive communication indicating a correct selection of content that matched an answer to the indexed event.

FIG. 22 shows a flowchart of an example method that may be used with the method 200 of FIG. 8, according to an example implementation. As shown at block 252, additional functions for providing possible answers to the gameplay of the game show on the user interface 119.

FIG. 23 shows a flowchart of an example method that may be used with the method 200 of FIG. 8, according to an example implementation. As shown at block 254, additional functions for based on not receiving the selection of content from the information associated with the indexed event prior to a contestant on the game show providing an answer to the gameplay, providing, to the user interface 119 of the computing device 104, a responsive communication indicating a correct selection of content that matched an answer to the indexed event.

Figure 24:
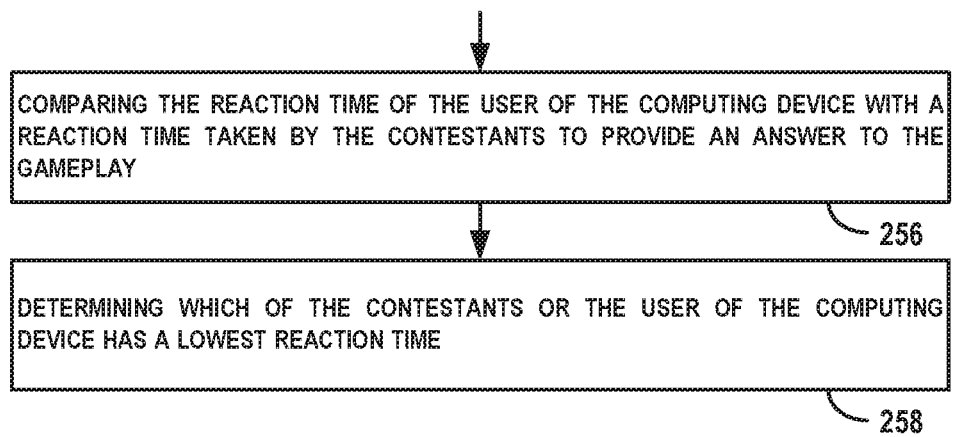
FIG. 24 shows a flowchart of an example method that may be used with the method of FIG. 8, according to an example implementation.

FIG. 24 shows a flowchart of an example method that may be used with the method 200 of FIG. 8, according to an example implementation. As shown at blocks 256-258, additional functions for comparing the reaction time of the user of the computing device 104 with a reaction time taken by the contestants to provide an answer to the gameplay, and determining which of the contestants or the user of the computing device 104 has a lowest reaction time. Examples of time events for comparison as described here are shown in FIG. 6.

Figure 25:
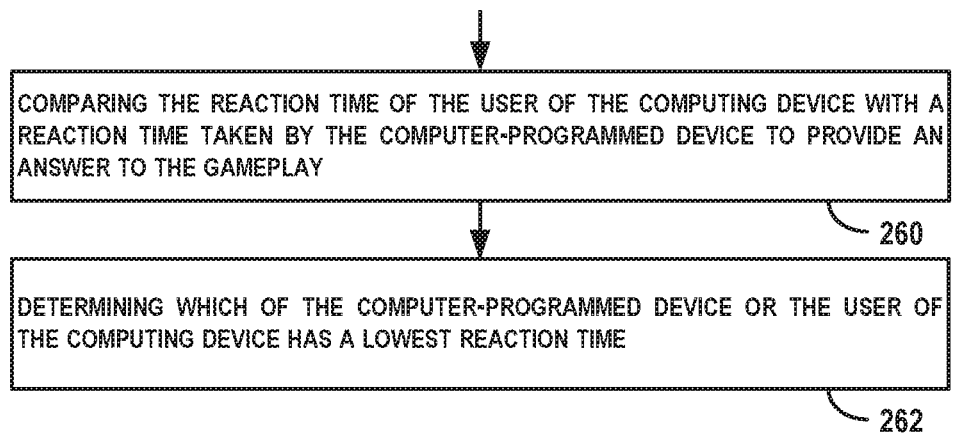
FIG. 25 shows a flowchart of an example method that may be used with the method of FIG. 8, according to an example implementation.

FIG. 25 shows a flowchart of an example method that may be used with the method 200 of FIG. 8, according to an example implementation. As shown at blocks 260-262, additional functions for comparing the reaction time of the user of the computing device 104 with a reaction time taken by the computer-programmed device to provide an answer to the gameplay, and determining which of the computer-programmed device or the user of the computing device 104 has a lowest reaction time. Examples of time events for comparison as described here are shown in FIG. 6.

The methods shown in FIGS. 8-25 provides examples of a synchronous "second screen" experience with or without synchronized user participation as the game show progresses. If the user participates, scores can be updated and compared with contestants on the game show.

The computing device 104 and/or the server 106 may execute any of the methods shown in FIGS. 8-25. Further, execution may occur in real-time. These functions can then occur with little to no delay to process additional data received from other sources or through manual input. The real time processing means that the computing device 104 and/or the server 106 perform the actions by continually processing the samples of content.

By the term "substantially" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
    causing a user interface of a computing device to initiate a gameplay interface;
    maintaining synchronization of the gameplay interface on the computing device with playout of an indexed recording, wherein the indexed recording includes a game show with contestants;
    determining a reaction time of a user of the computing device based, at least in part, on the indexed recording and a response of the user to the indexed recording;
    comparing the reaction time of the user of the computing device with a reaction time taken by the contestants to provide an answer to the gameplay; and
    determining which of the contestants or the user of the computing device has a lowest reaction time.

2. The method of claim 1, further comprising:
    receiving a sample of ambient content of the computing device; and
    determining a position identification of the sample of ambient content into the indexed recording to which the sample of ambient content matches,
    wherein maintaining synchronization of the gameplay interface on the computing device with playout of the indexed recording is based, at least in part, on the position identification.

3. The method of claim 1, further comprising:
    generating a reaction signal based on receiving a selection of content from the user interface of the computing device.

4. The method of claim 3, wherein determining which of the contestants or the user of the computing device has a lowest reaction time is based, at least in part, on the generation of the reaction signal.

5. The method of claim 3, wherein determining the reaction time of the user of the computing device further comprises determining the reaction time from an indexed event occurring in the indexed recording to the reaction signal.

6. The method of claim 5, further comprising:
    based on the indexed event occurring in the indexed recording, providing to the user interface of the computing device, information associated with the indexed event.

7. The method of claim 1, further comprising:
    receiving, at the user interface of the computing device, a responsive communication indicating whether the answer was correct.

8. A non-transitory computer readable medium having stored thereon instructions, that when executed by one or more processors, cause the one or more processors to perform functions comprising:
    causing a user interface of a computing device to initiate a gameplay interface;
    maintaining synchronization of the gameplay interface on the computing device with playout of an indexed recording, wherein the indexed recording includes a game show with contestants;
    determining a reaction time of a user of the computing device based, at least in part, on the indexed recording and a response of the user to the indexed recording;
    comparing the reaction time of the user of the computing device with a reaction time taken by the contestants to provide an answer to the gameplay; and
    determining which of the contestants or the user of the computing device has a lowest reaction time.

9. The non-transitory computer readable medium of claim 8, wherein the functions further comprise:
    receiving a sample of ambient content of the computing device; and
    determining a position identification of the sample of ambient content into the indexed recording to which the sample of ambient content matches,
    wherein maintaining synchronization of the gameplay interface on the computing device with playout of the indexed recording is based, at least in part, on the position identification.

10. The non-transitory computer readable medium of claim 8, wherein the functions further comprise:
generating a reaction signal based on receiving a selection of content from the user interface of the computing device.

11. The non-transitory computer readable medium of claim 10, wherein determining which of the contestants or the user of the computing device has a lowest reaction time is based, at least in part, on the generation of the reaction signal.

12. The non-transitory computer readable medium of claim 10, wherein determining the reaction time of the user of the computing device further comprises determining the reaction time from an indexed event occurring in the indexed recording to the reaction signal.

13. The non-transitory computer readable medium of claim 12, wherein the functions further comprise:
based on the indexed event occurring in the indexed recording, providing to the user interface of the computing device, information associated with the indexed event.

14. A system comprising:
a user interface;
one or more processors; and
non-transitory computer readable medium storing instructions, that when executed by the one or more processors, causes the one or more processors to perform functions comprising:
causing the user interface to initiate a gameplay interface;
maintaining synchronization of the gameplay interface with playout of an indexed recording, wherein the indexed recording includes a game show with contestants;
determining a reaction time of a user of the system based, at least in part, on the indexed recording and a response of the user to the indexed recording;
comparing the reaction time of the user of the system with a reaction time taken by the contestants to provide an answer to the gameplay; and
determining which of the contestants or the user of the system has a lowest reaction time.

15. The system of claim 14, wherein the functions further comprise:
receiving a sample of ambient content of the system; and
determining a position identification of the sample of ambient content into the indexed recording to which the sample of ambient content matches,
wherein maintaining synchronization of the gameplay interface with playout of the indexed recording is based, at least in part, on the position identification.

16. The system of claim 14, wherein the functions further comprise:
generating a reaction signal based on receiving a selection of content from the user interface.

17. The system of claim 16, wherein determining which of the contestants or the user of the system has a lowest reaction time is based, at least in part, on the generation of the reaction signal.

18. The system of claim 16, wherein determining the reaction time of the user of the system further comprises determining the reaction time from an indexed event occurring in the indexed recording to the reaction signal.

19. The system of claim 18, wherein the functions further comprise:
based on the indexed event occurring in the indexed recording, providing to the user interface, information associated with the indexed event.

20. The system of claim 14, wherein the functions further comprise:
receiving, at the user interface, a responsive communication indicating whether the answer was correct.

* * * * *